Feb. 27, 1940.  H. H. BLAU  2,191,952
METHOD FOR MAKING HOLLOW GLASS BUILDING BLOCKS
Filed Sept. 16, 1937  3 Sheets-Sheet 1
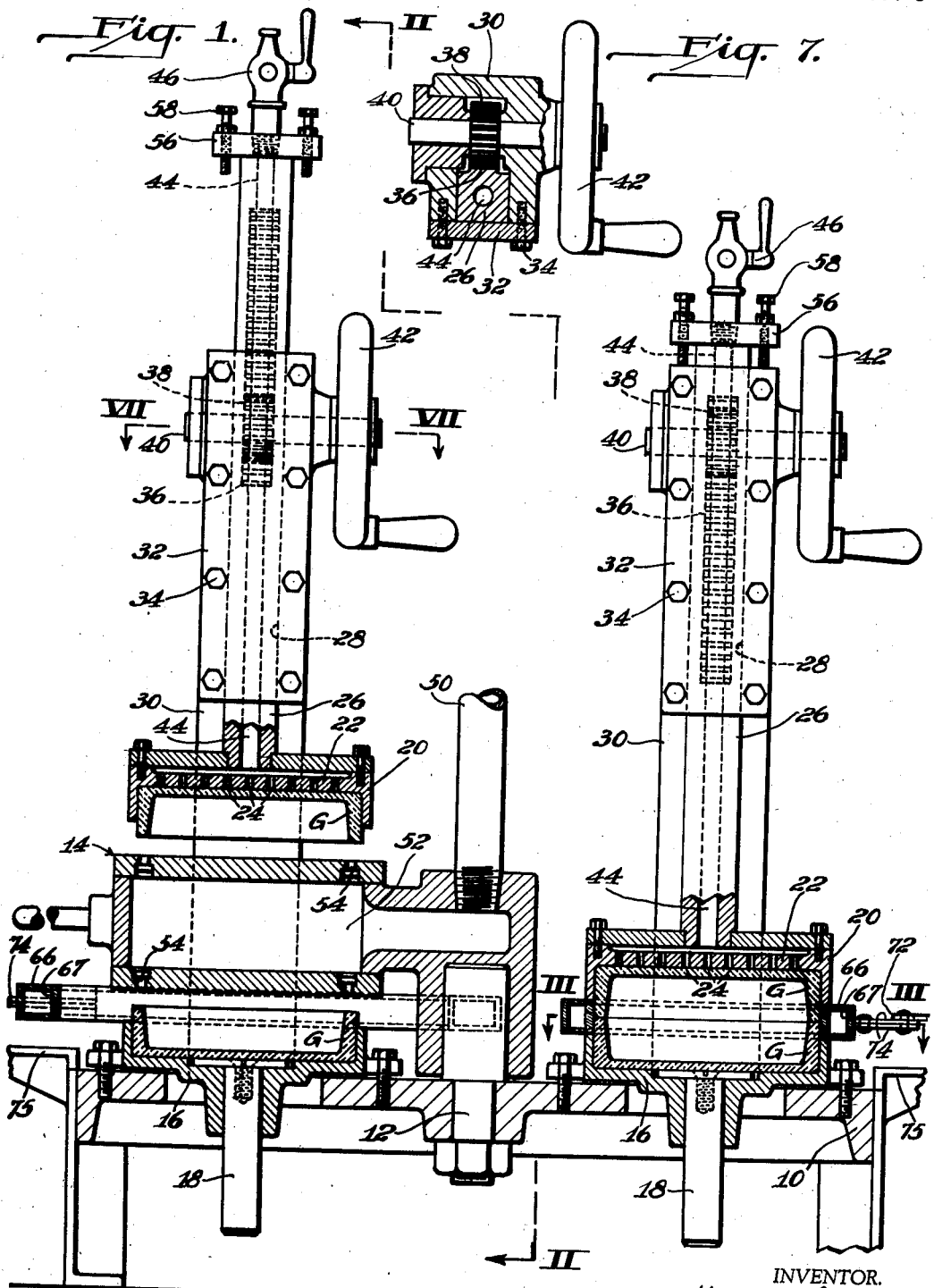
INVENTOR.
Henry H. Blau
BY Brown, Critchlow & Flick
his ATTORNEYS.

Feb. 27, 1940.                    H. H. BLAU                    2,191,952
              METHOD FOR MAKING HOLLOW GLASS BUILDING BLOCKS
                        Filed Sept. 16, 1937        3 Sheets-Sheet 2
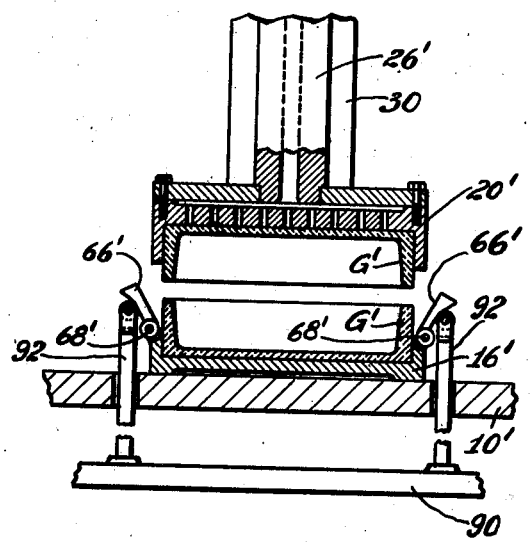
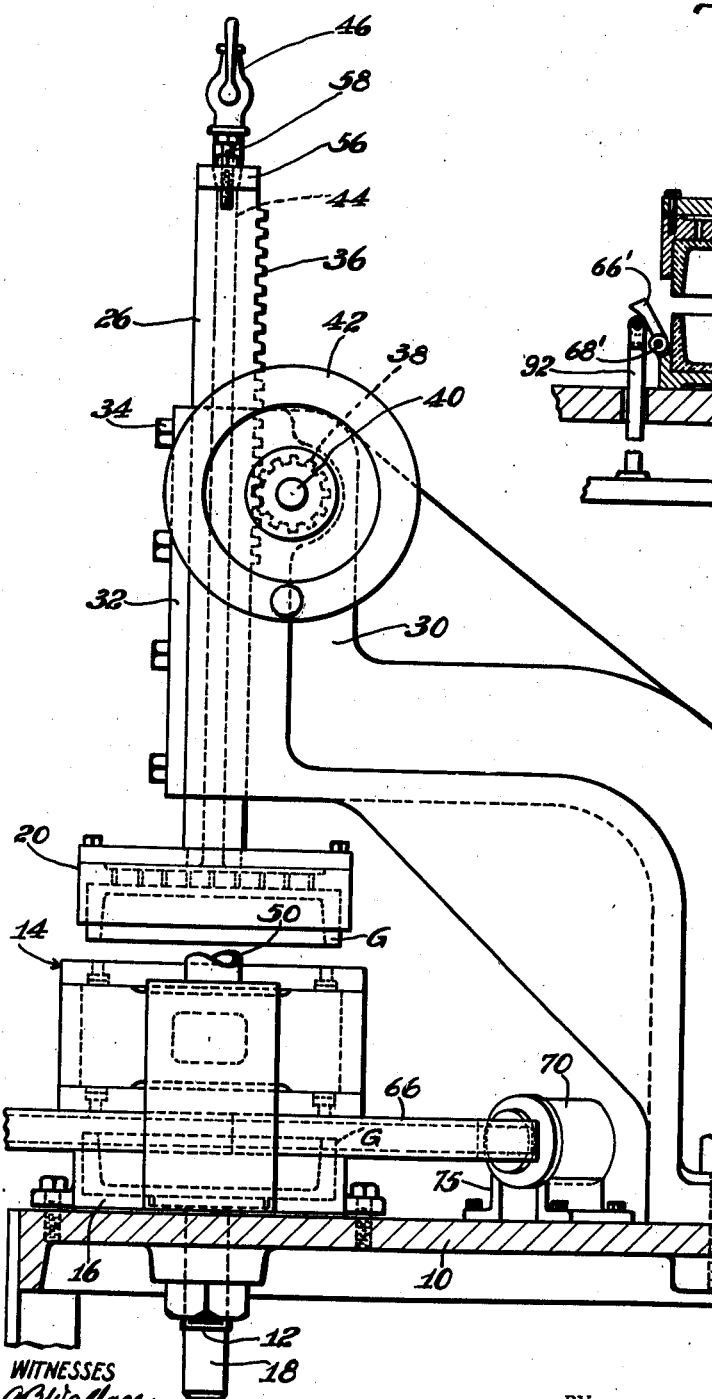
WITNESSES                                                INVENTOR.
                                                    Henry H. Blau
                                        BY  Brown, Critchlow & Flick
                                                 his ATTORNEYS.

Feb. 27, 1940.  H. H. BLAU  2,191,952
METHOD FOR MAKING HOLLOW GLASS BUILDING BLOCKS
Filed Sept. 16, 1937  3 Sheets-Sheet 3
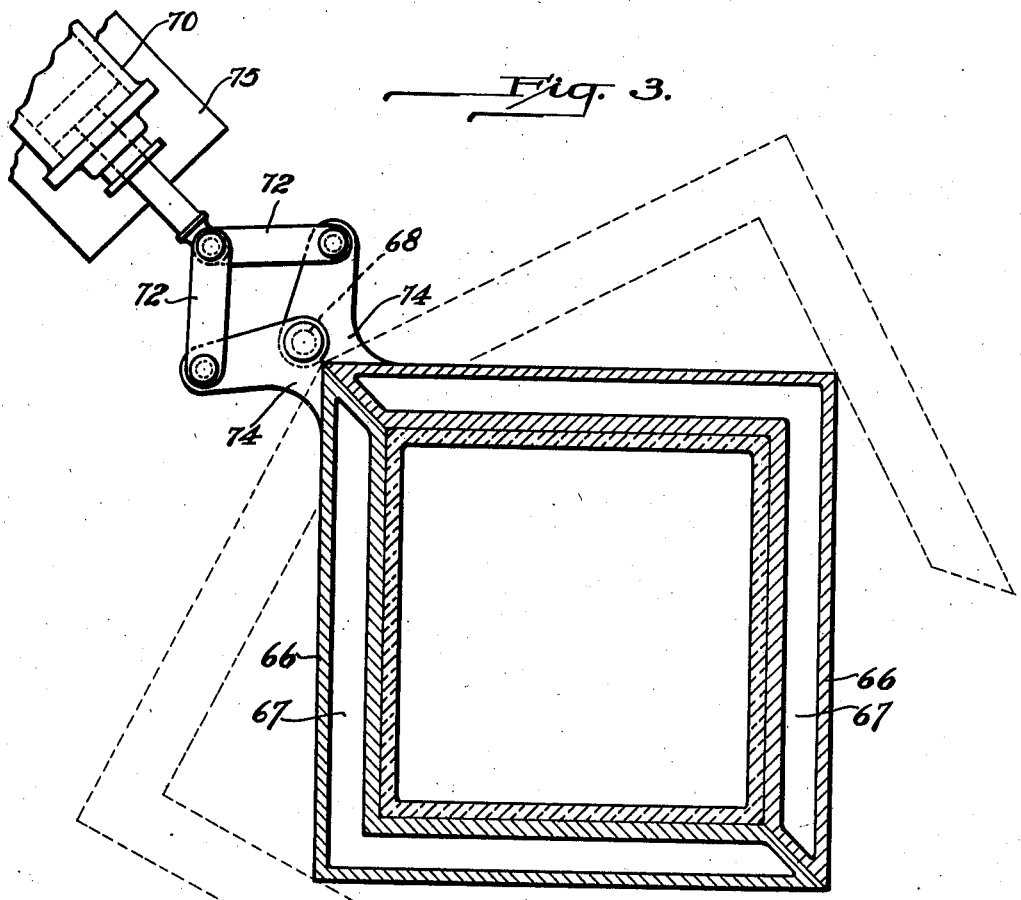
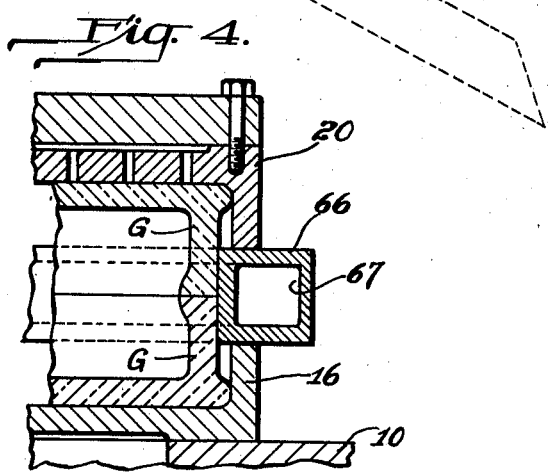
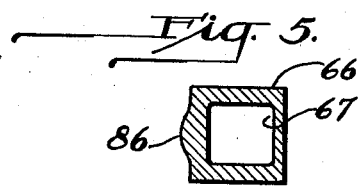
INVENTOR.
Henry H. Blau
BY Brown, Critchlow + Flick
his ATTORNEYS.

Patented Feb. 27, 1940

2,191,952

UNITED STATES PATENT OFFICE 2,191,952

METHOD FOR MAKING HOLLOW GLASS BUILDING BLOCKS

Henry H. Blau, Charleroi, Pa., assignor to Corning Glass Works, Corning, N. Y., a corporation of New York Application September 16, 1937, Serial No. 164,121

5 Claims. (Cl. 49—79)

This invention relates to methods for making hollow articles of glass from a plurality of preformed parts, generally two, which are heated after forming and pressed together to provide a sealed hollow article, and more particularly is concerned with cooling and/or molding the zone or line of joinder of the parts forming the article immediately after they are fused together and with preventing blowout of the zone of joinder of the article by the gas inside the article.

Heretofore hollow articles of glass, such as building blocks, have been made by press forming the parts, as for example in halves, with upstanding endless flanges which are heated at their edges and then pressed together. While in its broadest aspects this procedure is satisfactory, nevertheless I have found that hollow articles and particularly blocks made in accordance with it have been open to the objection that a relatively heavy bead or upset is formed at the inside and outside of the line of joinder of the parts. This bead or upset is ordinarily undesirable on the outside of the block or other article because it is not only unsightly but it interferes with the use of the article and in the case of a block it may prevent the use of strengthening rods and the application of mortar along the edges of the blocks. Further, I have found that known practices are open to the objection that the seal or joinder of the glass parts is apt to be accomplished too hot or too cold and the result is either an under-fused or over-fused zone or line of joinder between the parts. Moreover, in accordance with known practices, it has been necessary to hold the parts in fused relation until the glass has set or solidified which sometimes allows the hot gases on the inside of the article to blow through the zone of joinder and spoil the article.

It is the general object of my invention to avoid and overcome the foregoing and other objections to prior art practices by the provision of improved methods for forming hollow articles from glass wherein and whereby preformed glass parts are heated and fused together to form a hollow article and thereafter the zone of joinder of the parts is simultaneously cooled and molded and held against blowout.

Another object of my invention is to provide a method of making sealed hollow glass bodies from parts having upstanding continuous flanges wherein the parts are fused together in flange-to-flange relation and the line or zone of joinder of the parts is thereafter molded to form the exterior surface of the body to the shape and contour desired with an almost immediate setting or solidifying of the fused portions after molding.

Another object of my invention is the provision of novel methods for applying material such as granulated glass, porcelain, and the like, to the zone of joinder of glass parts forming a sealed hollow article.

The foregoing and other objects of my invention are achieved by the provision of a method for making hollow bodies of glass from preformed complemental parts having portions to be engaged which comprises in its broadest aspects heating the portions of the parts to be engaged to soften them, pressing the parts together to integrally fuse the softened portions to each other to form a hollow body, and then cooling and simultaneously molding the zone of joinder of the parts while holding them against blowout.

Apparatus for the practice of my invention and adapted to produce hollow bodies from complemental preformed glass parts having portions adapted to be engaged comprises means for supporting two glass parts, means for simultaneously heating the portions to soften them, means for moving the parts together to fuse the softened portions integrally to each other, and means for simultaneously cooling and molding the zone of joinder of the parts with or without the application of granulated glass, porcelain, and the like to the zone of joinder.

In the accompanying drawings, Fig. 1 is a vertical sectional view of one embodiment of apparatus for the practice of the principles of my invention; Fig. 2 is a vertical sectional view taken on line II—II of Fig. 1 and illustrating in greater detail the construction of the apparatus; Fig. 3 is a horizontal, cross-sectional view taken on line III—III of Fig. 1; Fig. 4 is an enlarged view of a portion of Fig. 1 illustrating the operation of the combined cooling and molding means forming a part of my invention; Fig. 5 is a cross-sectional view of a modification of the molding means shown in Fig. 4; Fig. 6 illustrates a modified form of molding and cooling means which may be associated with the apparatus illustrated; and Fig. 7 is a horizontal cross-sectional view taken on line VII—VII of Fig. 1.

It will be appreciated that the method of my invention can be carried out by many forms of apparatus. Specifically, it is adapted to relatively simple hand tools and operations and it is likewise readily adapted to use in conjunction with automatic turret-type glass-working machines. However, I have illustrated in the drawings a simple semi-automatic type of glass-working apparatus adapted to carry out my improved method and comprising in and of itself a novel combination of means. Sealed hollow glass articles of various kinds, shapes and sizes may be made by my novel method and apparatus but the invention has been illustrated in conjunction with the manufacture of hollow glass building blocks for which it is particularly adapted and accordingly will be so described.

Referring particularly to the drawings the numeral 10 indicates a table having a central stud 12 secured thereto which rotatably supports a burner, indicated as a whole by the numeral 14, for movement in a horizontal plane to and from a plurality of working stations. In the embodiment of my invention illustrated, two working stations are provided each of which includes a work-supporting member 16 adapted to removably receive a preformed glass part G which is held in the member 16 by gravity. A push-out 18 is incorporated with the holding member 16 so that the glass part or the finished glass body may be readily removed from the holding member.

Reciprocably mounted above the holding member 16 is a holding member 20 which removably receives a complementary glass part G. The holding member 20 may comprise a mechanical chuck for releasably gripping the glass part G or it can comprise, as illustrated in the drawings, a suction cup including a manifold 22 having a plurality of openings 24 extending to the face of the holding member and in communication with the glass part G.

The holding member 20 is adapted to be moved toward and from the holding member 16 and this may be accomplished by the provision of a plunger 26 secured at its lower end to the holding member and slidably received in a groove 28 formed vertically in a bracket support 30. A cover plate 32 removably secured to the bracket support 30 as by cap screws 34 holds the plunger 26 in the groove 28. The plunger 26, as best seen in Fig. 7, is provided with a rack 36 at its back which rack is engaged by a pinion 38 secured to a shaft 40 rotatably journalled in a horizontal position in the bracket support 30. A hand wheel 42 secured to the shaft 40 permits the pinion 38 to be rotated and plunger 26 and holding member 20 to be raised and lowered as desired. The plunger 26 is provided with a longitudinal bore 44 which extends to the manifold 22 and which receives at its upper end a valve 46 which controls the connection of sub-atmospheric pressure to the manifold 22.

The burner 14 is usually of the type adapted to burn a mixture of combustible gas, as for example oxy-acetylene, which is passed by a conduit 50 to a chamber 52 formed in the interior of the burner. The chamber 52 is provided with a plurality of burner openings 54 on its upper and lower surfaces which are in opposed relation to the portions of the glass parts G which are to be heated prior to being pressed together in sealing relation. It is to be understood that when the plunger 26 is in its uppermost position to hold the member 20 and associated glass part G in the uppermost position, the burner 14 can be swung about the stud 12 and between the glass parts to heat the opposed complemental portions thereof which are to be engaged. When the burner 14 is moved away from between the glass parts G after they have been heated the upper holding member 20 can be moved down to bring the glass parts into sealing relation. A cross bar 56 is preferably secured to the upper end of the plunger 26 and carries adjustable cap screws 58 which limit the downward movement of the holding bar 20, as will be understood.

An important part of my inventive concept is to cool, support and/or mold the zone or line of joinder of the glass parts immediately after they have been pressed together. I also hold the zone or line of joinder against blowing out which may be caused by gas pressure in the interior of the hollow body and use the pressure instead for molding and setting of the glass as hereinafter described.

Various means may be employed to perform the several functions and operations just described. One such means, as specifically illustrated in the drawings, includes an open and shut mold 66 which, as best seen in Fig. 3, may comprise two parts pivoted about a vertical pin 68 and moved from the closed full line position to the open dotted line position by suitable means, such as a fluid pressure motor 70 connected by links 72 to lugs 74 formed on the mold 66. The fluid pressure motor 70 and the pin 68 are secured to the table 10 by a bracket 75 and the arrangement of the parts of the mold 66 and the fluid pressure motor 70 with respect to the bracket support 30 and burner 14 is such that the mold does not interfere with the normal swinging movement of the burner and yet can be readily closed around the zone of joinder of the glass parts immediately after they have been pressed into sealing relation with each other. The exact time that the forming and cooling mold 66 is closed around the line of joinder of the parts can be widely varied as will be recognized and the length of time that the mold is applied to the glass parts can likewise be altered.

In Fig. 4 I have illustrated the action of the mold 66 against the line of joinder of the glass parts G and from this figure it will be seen that the mold 66 just clears the holding members 16 and 20. The mold 66 is preferably provided with an internal cavity 67 through which cooling fluid may be circulated during the molding action. Or if more convenient the mold 66 need not have a cavity, but in all events the mold effects a combined molding and cooling of the zone of joinder of the parts.

In engaging with the zone of joinder of the glass parts the mold 66 pushes any burr or upset inwardly of the hollow body so that the outer surface of the zone of joinder is made substantially flat. As illustrated in Fig. 5, I further contemplate forming a mold 66 with a shaping configuration such as a rib 86 so that I am able to groove or indent the zone of joinder of the glass parts. Glass building blocks made by the mold illustrated in Fig. 5 have a groove at the zone of joinder of the parts which adapts the blocks to receive a strengthening rod of metal or interlocking cement or mastic such as may be employed in the fabrication of the blocks together.

A novel part of my improved method is employing the mold 66 to coat the outer surface of the edges of the hollow block or other article formed with a granular material so that a better bond between the block and other material such as cement can be had. To this end I may coat the inner surface of the mold 66 with a layer of powdered or granular material such as glass, porcelain or the like, which material is transferred to the relatively soft and plastic surface of the glass parts at the zone of joinder when the mold is closed thereover.

When the glass parts are sealed together as just described, the gas trapped within the hollow article is ordinarily of less temperature than the glass parts which are usually joined together immediately after being preformed and while they still retain considerable heat. The heat in the bodies due to the forming operation is augmented by the heating of portions of the parts to be engaged so that the gas trapped within the sealed hollow body and originally at a comparatively low temperature is heated by contact with the glass so that a considerable pressure may be built up within the block after it has first been sealed and before it is cooled. However, in accordance with my invention the zone of joinder of the glass parts is positively held and supported during the setting of the glass therein so that the considerable internal pressure in the hollow body can not cause a blowout at the zone of joinder, all as above described. Moreover, the pressure on the inside of the block is utilized to force the glass at the zone of joinder of the parts into intimate relation with the mold 66 so that the zone of joinder is shaped as desired and so that the intimate contact effects a rapid transfer of heat from the glass to the mold 66. The result is that the zone of joinder of the glass is very uniformly molded and yet is quickly chilled so that production of the glass articles is not only accurate but rapid.

It is believed that the operation of my improved apparatus and the practice of my novel method will be evident from the foregoing description. However, briefly reviewing the operation, the preformed glass parts G, usually made by pressing operations, are transferred in pairs from the forming apparatus to the holding members 20 and 16. Opening the valve 46 secures the glass part in the upper holding member while the complemental glass part is held in the lower holding member by gravity. With the glass parts in spaced relation to each other as shown at the left-hand side of Fig. 1, the burner 14 is swung into position between them to heat the portions of the glass parts to be engaged to fusing temperature. The burner 14 is then swung out from between the glass parts and over between another pair of glass parts mounted at the second station. The glass parts which have just been heated are then pressed into sealing relation by the operation of the hand-wheel 42 and this is shown at the right-hand side of Fig. 1. The screws 58 limit the movement of the glass parts together.

Immediately after the glass parts have been pressed together in sealed relation with each other the fluid pressure motor 70 is operated to close the mold 46 tightly around the zone of joinder of the glass parts, as shown on the right-hand side of Fig. 2. The gas under pressure on the inside of the hollow article forces the zone of joinder of the parts into intimate relation with the mold 66 which shapes and then quickly cools the zone of joinder. The fluid pressure motor 70 is then operated in the other direction to open the mold 66, the suction valve 46 is turned to release the glass parts G from the holding member 20 and the plunger 26 is raised to its uppermost position. The push-out 18 is now operated to discharge the hollow glass body from the holding member 16 and the body is transferred by tongs or a paddle to the lehr conveyor. The holding members 16 and 20 are now in their original spaced apart relation with each other and another pair of glass parts to be heated and sealed together is placed therein and the cycle of operations is repeated.

It will be appreciated that during the heating of the glass parts by the burner 14 the halves of the mold 66 are back out of position so that they are substantially unaffected by the heat.

In the modified molding and cooling means illustrated in Fig. 6, glass parts G' are received in holding members 16' and 20', which are carried upon the table 10' and by the plunger 26'. Instead of closing the mold by horizontal movement thereof, the molding and cooling means 10 indicated at 66' are mounted on horizontal pivots 68' and are adapted to close about the four sides of the zone of joinder by vertical movement. Any particular means may be utilized to close the molds 66' around the line of joinder and one such means is illustrated as including a vertically moving cross-head 90 having upstanding arms 92 which extend through suitable apertures in the table 10' and into engagement with the molds 66'. Movement of the cross-head 90 vertically, as by a fluid pressure motor, not shown, effects the closing of the mold 66' around the four sides of the zone of joinder of the glass parts. Spring or other means may be utilized to return the molds 66' to the open position. The operation of this embodiment of my invention is similar to that heretofore described.

From the foregoing it will be recognized that the objects of my invention have been achieved by the provision of improved methods and apparatus for making hollow glass bodies from preformed parts. The zone or line of joinder of the parts is formed and cooled immediately after the parts are fused together and the result is an improved body of glass having parts integrally sealed together and solidified with the desired shapes and contours externally, and free from blowouts. The apparatus and the method are adapted to rapid commercial production and operation and are relatively simple and inexpensive and result in the provision of a uniformly superior product.

It will be seen that my invention provides for the commercial production of sealed hollow glass articles without a resulting low internal pressure under the temperatures and conditions of use. Known methods and apparatus for making hollow articles have resulted in considerable vacuum in the articles which may be undesirable in many instances, as for example, in the manufacture of large glass building blocks when the blocks are subjected to stress in use. In a block made as herein described the internal pressure can be made almost atmospheric so that no high pressure differential tends to collapse the block. As a result I am able to make sealed glass articles of any desired size without ordinarily increasing the weight or thickness of the walls.

While in accordance with the patent statutes I have specifically illustrated and described certain embodiments of apparatus and have explained the method of my invention in conjunction therewith, it should be understood that neither my improved apparatus nor method is limited to the disclosures given and that therefore my invention is to be read in the terms of the appended claims.

I claim:

1. That method of making closed hollow building blocks of glass from a pair of parts, which comprises supporting the parts in spaced-apart alignment, uniformly heating each of the portions of the parts to be engaged to soften them, pressing the parts together by relative movement of the pair of parts to integrally fuse the softened portions to each other to form a closed hollow building block, and molding the zone of joinder of the parts by the application of pressure simultaneously to the complete zone in a direction toward the block and substantially at right angles to the face of the zone.

2. That method of making sealed hollow glass building blocks from press-formed parts having upstanding flanges, which comprises holding the parts with their flanges in spaced-apart and aligned relation, simultaneously heating the flanges to soften them, pressing the parts together to integrally fuse the softened flanges to each other to form a hollow body, and after the completed joining operation molding the zone of joinder of the parts over its full length simultaneously to change the surface contour of both flanges.

3. That method of making hollow building blocks of glass from preformed parts having upstanding right angle flanges, which comprises holding the parts with their flanges in aligned but spaced-apart relation, simultaneously and uniformly heating the flanges to soften them, pressing the parts together to integrally fuse the softened flanges to each other to form a sealed hollow building block, and after the pressing operation is completed cooling and molding the zone of joinder of the parts over its entire length simultaneously, and releasing the hollow body.

4. The method of making a closed hollow glass building block from a pair of flanged halves thereof, comprising heating the edges of the flanges of both halves to a fusion temperature, placing the heated flange edges of the halves together and pressing the halves towards each other integrally to fuse said edges together to form a hollow building block, and during said pressing operation molding the complete zone of joinder of the flanges by applying pressure thereto substantially at right angles to them and simultaneously throughout their extent.

5. The method of making a closed hollow glass building block from a pair of flanged halves thereof, comprising heating the edges of the flanges of both halves to a fusion temperature, placing the heated flange edges of the halves together and pressing the halves towards each other integrally to fuse said edges together to form a hollow building block, and during said pressing operation chilling the block flanges by applying a chilled mold to said flanges and pressing said mold against said flanges simultaneously throughout their extent in a direction substantially at right angles to said flanges.

HENRY H. BLAU.